March 28, 1961  H. PH. G. A. R. VON ZBOROWSKI  2,977,080
AIRCRAFT HAVING A DETACHABLE CABIN
Filed April 12, 1956  3 Sheets-Sheet 1
Fig.1.
Fig.2.
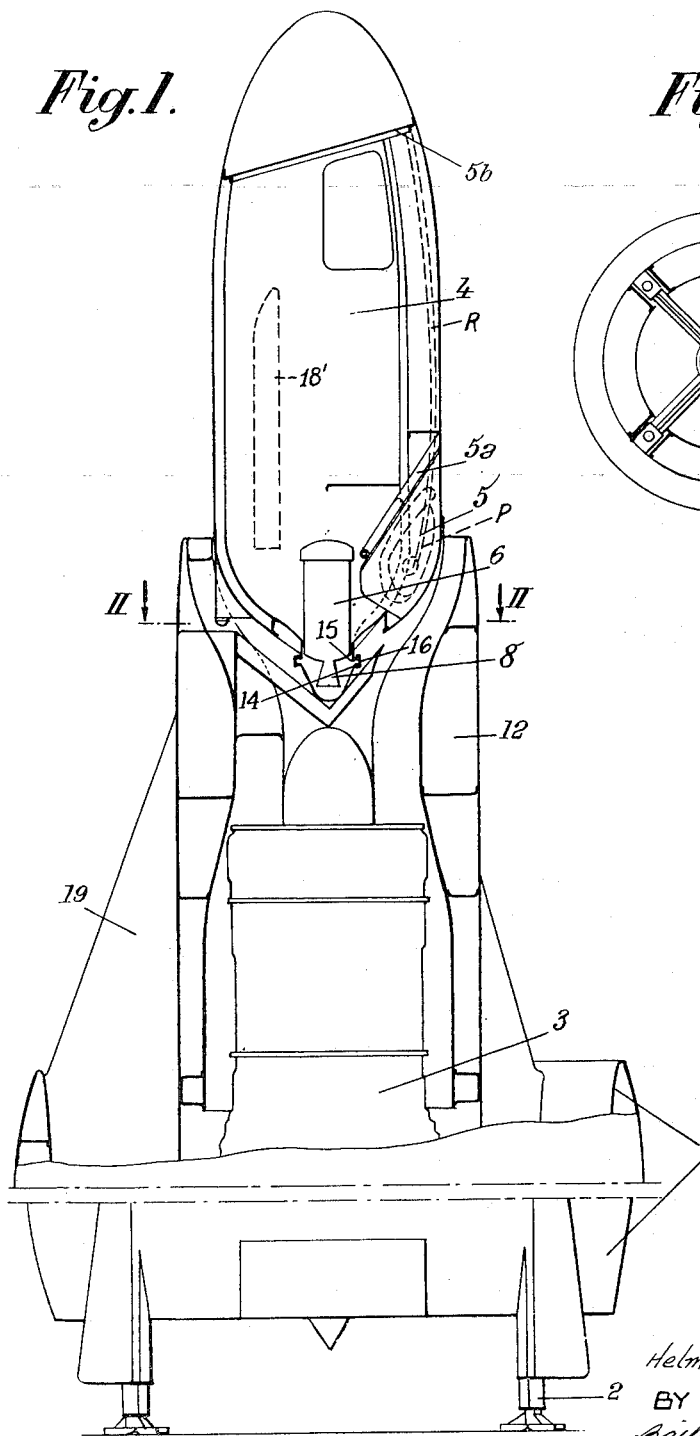
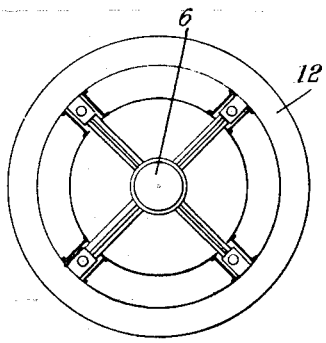
INVENTOR
Helmut Ph. G. A. R. von Zborowski
BY
ATTORNEYS

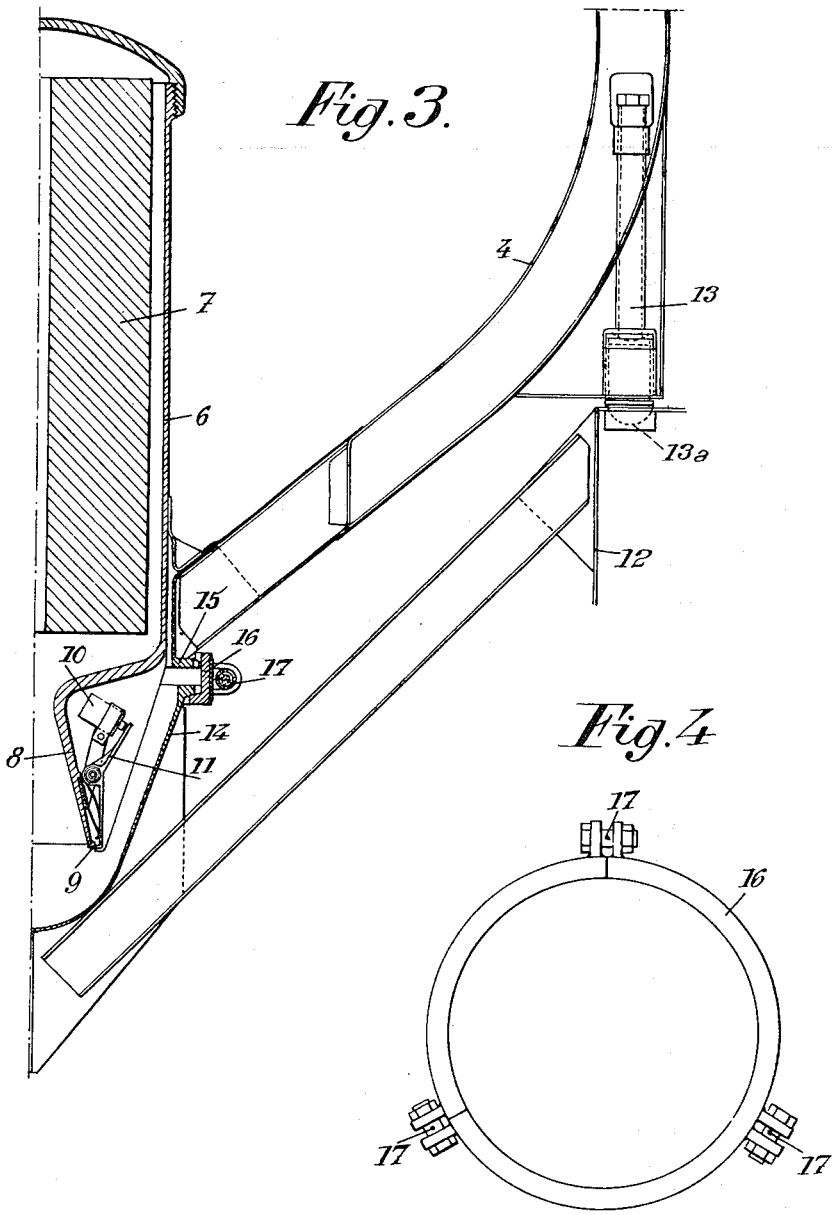

March 28, 1961  H. PH. G. A. R. VON ZBOROWSKI  2,977,080
AIRCRAFT HAVING A DETACHABLE CABIN
Filed April 12, 1956  3 Sheets-Sheet 3

INVENTOR
Helmut Ph. G. A. R. von Zborowski
BY
ATTORNEYS 2,977,080

AIRCRAFT HAVING A DETACHABLE CABIN

Helmut Ph. G. A. R. von Zborowski, Chateau de Boussy-St. Antoine par Brunoy, France Filed Apr. 12, 1956, Ser. No. 577,862

Claims priority, application France May 4, 1955

4 Claims. (Cl. 244—140)

The present invention relates to aircraft having a detachable cabin, this cabin being made either for the crew or for the passengers, or for both.

My invention is more especially intended to be used in connection with vertical take-off aircraft, and in particular aircraft as described in my British Patent No. 730,069.

The chief object of my invention is to provide an aircraft of the above mentioned type which is better adapted to meet the requirements of practice, and in particular which is safer in operation.

According to my invention, the releasable cabin, which is provided with at least one parachute and means for unfurling this parachute when necessary, includes a propelling device of the rocket type and control means for deflecting the jet of said rocket propelling device, said control means being operative from the inside of the cabin, whereby it is possible to pilot said cabin when it is detached from the body of the aircraft.

Preferred embodiments of the present invention will be hereinafter described with refernce to the accompanying drawings, given merely by way of example and in which:

Fig. 1 is an elevational view with parts in axial section of an aircraft having a detachable cabin made according to my invention.

Fig. 2 is a sectional view on the line II—II of Fig. 1.

Fig. 3 is an axial half-section on an enlarged scale corresponding to a part of Fig. 2.

Fig. 4 is a plan view of an element of the means for securing the cabin to the aircraft body.

Figure 5:
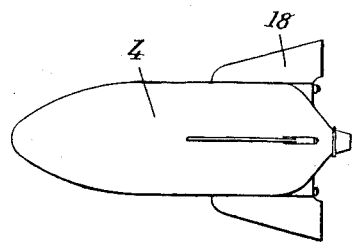
Figure 6:
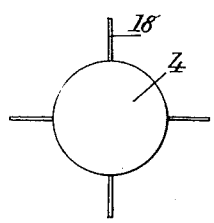

Figs. 5 and 6 diagrammatically show, respectively in side view and in rear view, a first embodiment of the cabin illustrated by Fig. 1.

Figure 7:
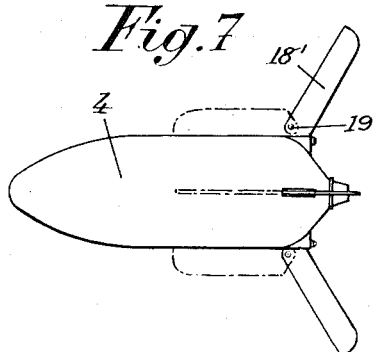
Figure 8:
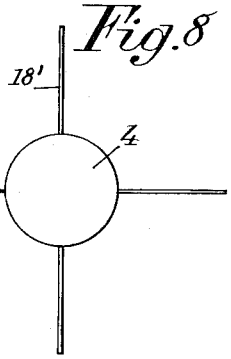

Figs. 7 and 8 are figures similar to Figs. 5 and 6, showing another embodiment.

Figure 9:
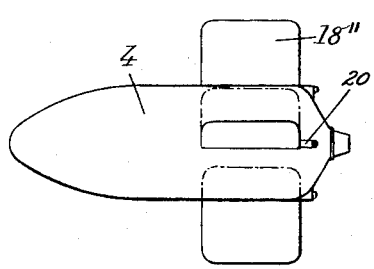
Figure 10:
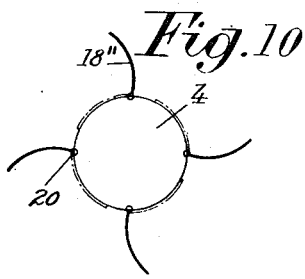

Figs. 9 and 10 are figures, similar to Figs. 5 and 6 respectively, showing still another embodiment.

Parachute devices for use in connection with airplanes have been so much improved that it is now possible to use them for dropping in conditions of practically perfect safety not only personnel but also very heavy material and, in particular, the detachable cabin of an aircraft.

However, all parachute devices of this kind have a very serious drawback due to the fact that the unfurling of a parachute requires a given period of time the duration of which depends in fact upon the flying speed of the aircraft at the time where the parachute is detached. To the minimum period of time necessary for complete unfurling of the parachute, that is to say for the minimum period of time at the end of which said parachute becomes efficient, corresponds a given height for vertical dropping which determines a safety altitude below which it would be dangerous to drop a cabin supported by a parachute because the cabin would risk reaching the ground with too high a speed.

In order to reduce this safety altitude, it has been proposed to provide parachutes with means for expelling them so as to facilitate their unfurling, and it has also been proposed to provide an accelerating device which acts upon the load that is dropped with the parachute (case of ejectable seats in particular). Both solutions may be combined and, in this way, it has been made possible to reduce the safety altitude to a value of about fifty meters for an aircraft having a relatively low flying speed.

On the other hand, in the case of a high speed vertical take-off aircraft (and in particular such as described in my British Patent No. 730,069), it becomes more difficult to provide a parachute system as above described because this system must be able to operate as well when the aircraft is flying horizontally as when it is taking off or landing vertically. The problem is still more difficult to solve in the case of a fighter airplane intended to attack ground objectives because the aircraft is most in danger just when it is near the ground at the end of a dive.

The object of my invention is to give a solution to the above stated problems. In particular my invention makes it possible to reduce the value of the safety altitude practically to zero.

I will first give a short description of the essential features of a vertical take-off aircraft such as described in my British Patent No. 730,069. Such an aircraft is visible on Figs. 1 and 2 and includes the following elements:

On the one hand, a tunnel-shaped supporting wing 1 having preferably a circular transverse section, said wing being provided, close to its trailing edge, with telescopic supporting members 2;

On the other hand, a propelling device 3 (for instance a turbo-jet engine) housed at least partly in said annular wing 1 and the thrust of which is exerted along a line which coincides substantially with the axis of said annular wing 1, the thrust of said engine being higher than the weight of the aircraft in take-off conditions;

And finally, a cabin for the crew (and possibly for the passengers), this cabin 4 being preferably in the shape of a surface of revolution, located at the front part of the engine 3 and having its longitudinal axis in coincidence with the line of thrust of said propelling device and with the axis of annular wing 1.

Cabin 4 is detachable from the body of the aircraft and includes a housing 5 which preferably opens frontwardly and upwardly (when the aircraft is flying horizontally), in which housing is located a parachute P (shown in dotted lines on Fig. 1) capable of supporting the cabin with the persons present therein.

Parachute P is connected to the cabin through ropes R (Fig. 2) which are preferably fixed to the front transverse element 5b of the cabin and which normally are folded up in a housing provided between said element 5b and housing 5.

According to my invention, cabin 4 is provided with a propelling device 6 of the rocket type, wholly independent of the main engine 3 of the aircraft, and control means capable of deflecting the propelling jet of said rocket propelling device 6 are arranged so as to be operative from the inside of cabin 4 once this cabin has been detached and the rocket propelling device has been brought into action.

The rocket propelling device 6 is advantageously of the powder rocket type and it is housed in a casing, preferably of cylindrical shape and coaxial with the aircraft (this casing being designated by the reference numeral 6 on Fig. 3), and it contains a powder charge 7. Casing 6 is located at the rear of cabin 4 and it includes, integral therewith, a nozzle 8 through which flows the jet of gases resulting from the combustion of the powder charge 7.

It should be noted that any angle may be provided between the axis of the cabin and that of the propelling device, provided that the line of thrust of the propelling device passes substantially through the center of gravity of the cabin (including therein the loads it is to contain).

The control means which must permit of deflecting the propelling jet issuing from nozzle 8 are advantageously constituted by a plurality of spoilers 9 distributed at the periphery of the rear edge of said nozzle. The term "spoiler" is taken to designate means capable of occupying, with respect to the gas jet, either a retracted position (neutral position), or a position in which they project into the gas jet at right angles to the general direction of said jet (active position), the presence of said means in the last mentioned position modifying the conditions of flow in the vicinity of the obstacle constituted by said means and therefore modifying the direction of the thrust exerted by said jet.

On Fig. 3 I have shown, by way of example, spoilers 9 (the number of which is four) controlled by means of electro-magnets 10 capable of acting upon bent levers 11 one of the branches of which is directly operated by the electro-magnet, the other branch serving to support a spoiler 9. When the electro-magnet 10 is energized, it causes the corresponding spoiler 9 to project into the jet flowing through nozzle 8.

The respective electro-magnets 10 are then connected with a piloting device capable of energizing one or the other of said electro-magnets. This piloting device may be constituted by a joy-stick located close to the pilot seat and which may be distinct from the main joy-stick of the aircraft.

The electro-magnets may also be controlled in connection with an automatic stabilizing device, such as described in the above mentioned prior patent. This stabilizing device serves, under normal conditions (that is to say when cabin 4 is not detached), to keep the axis of the aircraft automatically in vertical position during the take-off and landing operations, so that the pilot has not to bother with maintaining the verticality of this axis during these operations. Such an automatic stabilizing device may be of the gyrometer and/or gyroscopic type.

It will be understood that an emergency device made as above stated will enable the pilot, in case of necessity and when the aircraft is close to the ground (and in particular below the safety altitude), to pilot cabin 4, after it has been detached from the aircraft, in the same manner as an independent aircraft and to compel it to fly back to the safety altitude before the parachute is expelled from its housing 5. It is interesting to note that, owing to this possibility of piloting cabin 4 during this period, the pilot may also maneuver in order to avoid obstacles that might lie across this path (trees, houses, hills, etc.).

Of course an emergency device of the above mentioned kind gives a greatly increased safety to vertical take-off aircraft, and this at the cost of a very low increase of weight which averages 1% in the case of a single seat aircraft and 3% in the case of a multiseat aircraft. Besides it should be indicated that these percentages have been calculated with the assumption that the maximum acceleration given by rocket engine 6 to cabin 4 are about 2g, but it would be possible further to reduce the above stated percentages by using higher accelerations of the cabin.

I will now describe several features of my invention relating to the assembling of cabin 4 with the body 12 of the aircraft (which body acts as a casing for the main engine 3) and also to the means used for detaching said cabin when necessary.

According to one of these features, I group in a single zone, preferably accessible from the outside of cabin 4, the elements of the system for fixing the cabin to the body 12 of the aircraft, said zone being advantageously located in the vicinity of the longitudinal axis of the aircraft and at the rear of cabin 4. In this case, it is advantageous to complete the assembly means to be provided between cabin 4 and body 12 by the provision of peripheral stretching members 13 carried by one of the elements to be connected together (cabin 4 and body 12) and which bear against the other element, preferably through a conical or hemispherical bearing 13a as shown by Fig. 3. These members 13 are intended to exert, once the central assembly device is in position, an effort urging cabin 4 away from body 12. Thus the whole of said central assembly means and of said peripheral members 13 forms a rigid and indeformable construction of the whole of cabin 4 and body 12.

On the other hand, according to another feature of my invention, release of the central assembly means may be obtained by acting upon a single locking element, the desired release being advantageously obtained through electric means which act for instance upon a single explosive charge.

I may, according to an arrangement which is not shown by the drawings, connect the rear of cabin 4 to the front part of body 12 by an explosive bolt.

I may also provide, between a piece in the form of a body of revolution 14 rigid with body 12 and a ring member 15 rigid with cabin 4, a fixation system of the bayonet kind including a peripheral ring 16 made of several part-circular portions, the successive portions being connected together by explosive bolts 17, as shown by Fig. 4.

I might also provide at least two assembly sections held together by a collar kept tight by an explosive bolt, this collar member being made thin and therefore expansible or being hinged in such manner that, once the explosive bolt has been destroyed, the assembly sections are released.

With such a central assembly device, it suffices to destroy the explosive bolt or bolts 17 to release cabin 4 from the body 12 of the aircraft.

It is advantageous to combine the means for detaching cabin 4 with those for starting the operation of the propelling rocket 6. Simultaneous operation of these two means can easily be obtained when they are controlled electrically. It suffices to connect with the same electric circuit controlled by a single member the means for releasing the cabin and the means for starting the rocket engine 7.

The control means may be operated manually, for instance by the pilot.

According to another feature of my invention, the device for driving out the parachute is placed under control of the operation of the rocket propelling device 6 in such manner that said parachute is driven out automatically when the powder 7 of said propelling device is nearly exhausted.

For this purpose for instance I may provide, together with rocket propelling device 6, a delay relay acting on the device for driving out the parachute.

Finally, according to a feature of my invention which is independent of the preceding ones, cabin 4 is provided with aerodynamic stabilizing means such as tail units which may be made as follows.

In the construction of Figs. 5 and 6, said tail units 18 are fixed.

In the construction illustrated by Figs. 7 and 8, the tail unit elements 18' pivot about axes 19 at right angles to the axis of cabin 4.

In the construction illustrated by Figs. 9 and 10, the tail unit elements 18" are pivoted about axis 20 parallel to the axis of cabin 4. In this case, the tail unit elements have a curved shape so that, in the retracted position, they can fit against the body of the cabin and even they may retract therein.

In the two first mentioned cases, the tail unit elements 18, 18', are preferably disposed at the front of, and in line with, arms 19 which connect the annular wing 1 with the body of the aircraft.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claims.

What I claim is:

1. In an aircraft, the combination of a main body, a cabin, means for detachably securing said cabin to said body, a parachute fixed to said cabin, a rocket device carried by said cabin and having a rearward nozzle at the rear end of said cabin to deliver a jet capable of propelling said cabin in flight, means carried by said device for varying the direction of said jet, and control means operable from the inside of said cabin and operatively connected with said jet directed varying means for actuating said last means for varying the direction of the jet selectively through a variety of angles after detachment of the cabin from the body, whereby said cabin, when detached from said body, can be piloted by means of said control means.

2. In an aircraft, the combination of a main body, a cabin, means for detachably securing said cabin to said body, a parachute fixed to said cabin, a rocket propelling device carried by said cabin, said propelling device including a rearward nozzle located at the rear of the cabin, and spoilers movably mounted on said nozzle for deflecting the jet of said rocket propelling device and control means operable from the inside of said cabin operatively connected with said spoilers for selectively moving them to a variety of positions after the detachment of the cabin from the body, whereby said cabin, when detached from said body, can be piloted by means of said control means.

3. A combination according to claim 1, further including tail unit means pivoted to said cabin about axes perpendicular to the axis of said cabin.

4. A combination according to claim 1, further including curved tail unit means pivoted to said cabin about axes parallel to the axis of said cabin.

References Cited in the file of this patent

UNITED STATES PATENTS

| | | |
|---|---|---|
| 1,879,187 | Goddard | Sept. 27, 1932 |
| 2,395,809 | Goddard | Mar. 5, 1946 |
| 2,430,896 | Uhl et al. | Nov. 18, 1947 |
| 2,591,867 | Prower et al. | Apr. 8, 1952 |
| 2,702,680 | Heinemann et al. | Feb. 22, 1955 |
| 2,736,523 | Chaplin | Feb. 28, 1956 |

FOREIGN PATENTS

| | | |
|---|---|---|
| 699,290 | Great Britain | Nov. 4, 1953 |
| 702,148 | Great Britain | Jan. 13, 1954 |
| 702,149 | Great Britain | Jan. 13, 1954 |
| 714,892 | Great Britain | Sept. 1, 1954 |
| 731,660 | Great Britain | June 8, 1955 |
| 1,002,316 | France | Mar. 5, 1952 |